Patented Jan. 2, 1951

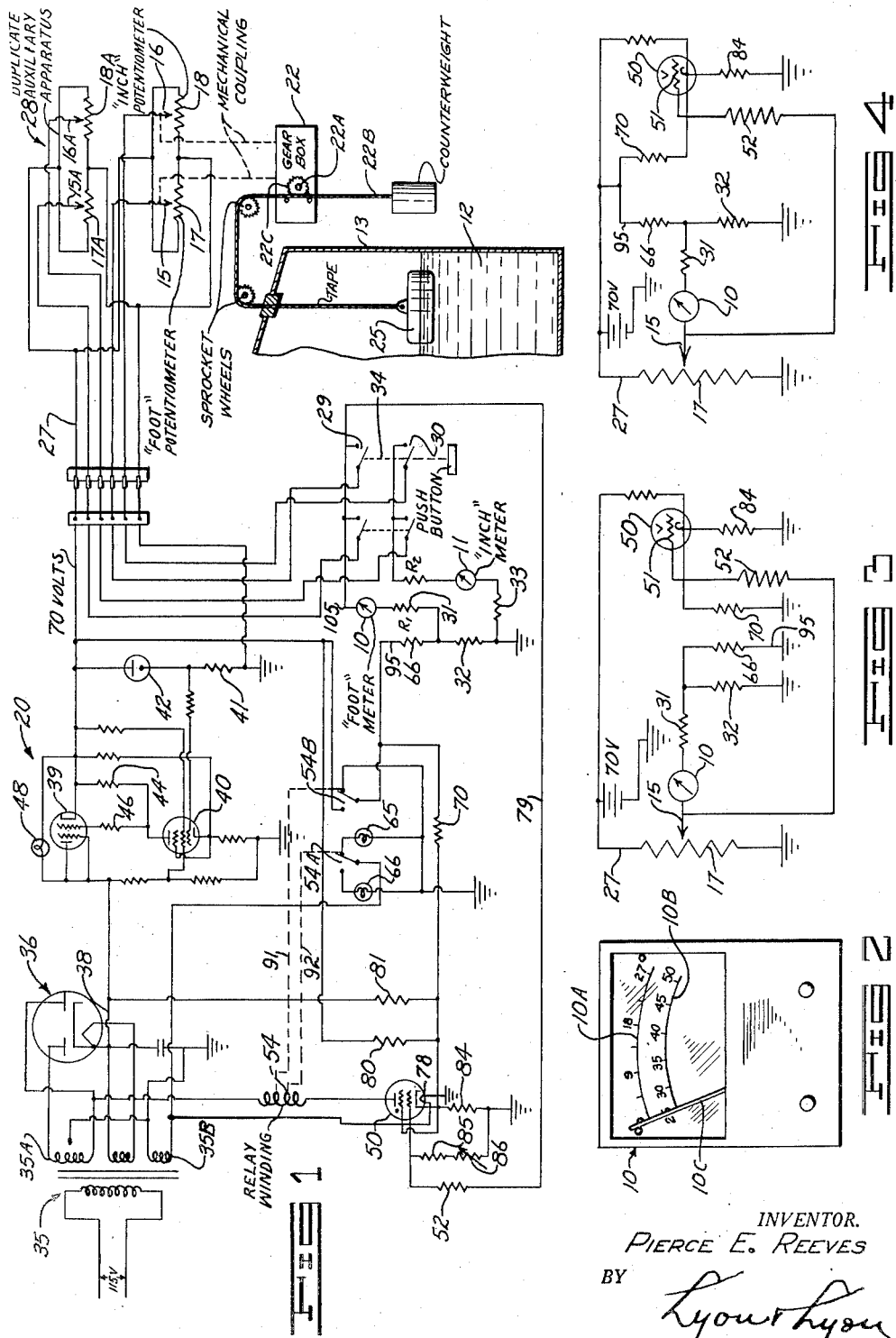

2,536,465

UNITED STATES PATENT OFFICE 2,536,465

REMOTE READING LIQUID LEVEL GAUGE

Pierce E. Reeves, Los Angeles, Calif., assignor, by mesne assignments, to The Vapor Recovery Systems Company, Compton, Calif., a corporation of California Application April 12, 1949, Serial No. 86,898

6 Claims. (Cl. 177—351)

1

The present invention relates to an improved measuring system and more specifically to a remote reading liquid level gage.

Briefly, the present invention contemplates the use of a potentiometer type of resistance having a member continuously movable through more than 360° to indicate liquid levels on a remotely located large-faced indicating instrument which has two coaxially arranged discontinuous dial scales for cooperation with a single pointer. The present invention further contemplates the use of means to effect readings on different dial scales when the liquid reaches a predetermined level. In general, the present invention contemplates the provision of a novel precision liquid level indicating instrument of this character which incorporates means to minimize the "overlap" in readings on the two coaxially arranged dial scales, and further by the provision of novel means including a novel voltage regulating circuit and a novel thyratron control circuit, all contributing to the precision of the instrument.

An object of the present invention is to provide an improved measuring system of the type using large faced indicating instruments, the scale of which is expanded by continuing it adjacent to a different portion of the same scale for cooperation with the same indicating pointer.

Another object of the present invention is to provide an improved remote reading liquid level gage characterized by its simplicity, inexpensiveness and accuracy, and the incorporation therein of a large indicating meter.

Another object of the present invention is to provide an improved remote reading liquid level gage characterized by the fact that the scale readings always indicate the true liquid level regardless of the fact that there may have been a power failure in the interim.

Still another object of the present invention is to provide an improved remote reading liquid level gage characterized by the fact that a voltage regulated power supply is connected in a novel manner with remote meter units of the resistance potentiometer type to effect remote indications on a meter having an enlarged coaxial discontinuous scale.

Yet another object of the present invention is to provide an improved measuring system incorporating as the indicating element therein a meter having an enlarged scale, the portions of which are discontinuous and coaxially arranged for cooperation with the same indicating pointer, the invention being characterized by the fact that means are provided whereby the overlap on such coaxially arranged scale portions is of relatively small degree.

Yet another object of the present invention is to provide an improved measuring system of the type wherein an indicator having an enlarged scale, portions of which are coaxially arranged for cooperation with the same indicating pointer, is used, the invention being characterized by the fact that a thyratron or gaseous discharge device is connected in a novel manner in such system to change the sensitivity of the meter, to thereby produce indications of different magnitude on different scale portions constantly uniformly, accurately and substantially independently of temperature variations of the thyratron cathode.

Another object of the present invention is to provide an improved voltage regulator capable of regulating a voltage of a voltage source arranged to deliver substantially large amounts of current with a minimum number of controlled electron discharge devices.

Still another object of the present invention is to provide an improved remote reading liquid level gage using remotely located transmitters of the resistance potentiometer type, fed by a voltage regulated power supply to produce indications on an enlarged scale having portions thereof coaxially arranged for cooperation with a single pointer, and in which a gaseous discharge device, compensated for cathode temperature variations, is used to automatically change the scale reading at predetermined voltages corresponding to a maximum scale reading on one of said scale portions.

Yet another object of the present invention is to provide an improved remote reading liquid level gage characterized by the fact that a relatively few wires of relatively small cross section are required, for the intended purpose, between the local station and the remote station at which liquid levels are determined and relayed.

Yet a further object of the present invention is to provide an improved measuring system of a type wherein a measuring instrument having a plurality of coaxially arranged scale portions are used for cooperation with a single pointer, the invention being characterized by the fact that novel means are incorporated to reduce materially the overlap on two of such adjacent coaxially arranged scale portions.

Yet another object of the present invention is to provide an improved control circuit for a gaseous discharge device of the thyratron type characterized by the fact that the operation of such device is rendered substantially independent of cathode temperature variations.

Still a further object of the present invention is to provide an improved remote reading liquid level gage of the type indicated above, wherein a single indicator having coaxially arranged scale portions for cooperation with a single pointer may be used to indicate liquid levels measured by any one of a plurality of remotely located transmitter units.

The features of the present invention which are believed to be novel are set forth with particularity in the appended claims. This invention itself, together with further objects and advantages thereof, may be best understood by reference to the following description taken in connection with the accompanying drawings in which:

Figure 1 is a schematic representation of a remote reading liquid level gage system embodying features of the present invention.

Figure 2 is a view showing the front face of the "foot" meter or indicator shown in Figure 1, it being noted that the scale of the meter shown in Figure 2 comprises a plurality of coaxially arranged discontinuous scale portions arranged for cooperation with a single pointer.

Figures 3 and 4 are simplified circuit diagrams of portions of the electrical network shown in Figure 1 when the relay of Figure 1 corresponding respectively to the conditions is actuated to produce readings (a) on the "Low" scale portion of the "foot" meter shown in Figure 2, and (b) on the "High" scale portion of the same meter.

General description

The purpose of the apparatus described presently is to produce remote indications on the "foot" and "inch" meters 10 and 11 respectively of the height of liquid 12 in a remotely located tank 13. The readings of the meters 10 and 11 are combined to produce the exact reading. For example, the meter 10, as shown in Figures 1 and 2, is preferably of the type having an enlarged scale for observation at relatively large distances.

The "foot" meter 10, shown in Figure 2, has two scale portions 10A, 10B coaxially arranged and discontinuous for cooperation with a single dial pointer 10C.

One of the features of the present invention, as is described in greater detail hereinafter, is that the common overlap between readings on the scales 10A, 10B is of relatively small amount. Thus, scale 10A is used to indicate liquid levels in the range of zero to 27 feet, while the other scale portion 10B indicates liquid levels in the range of 25 to 50 feet, it being noted that there is an overlap of only two feet (27 minus 25) in the two scales 10A, 10B.

In order to determine with exactitude the height of the liquid 12 in the tank 13, the meter 10 is first read to indicate the feet, and to the reading thus obtained the reading of the "inch" meter 11 is added. The "inch" meter 11 may be simply a milliammeter having a full scale indicia of 12 corresponding to 12 inches.

In general, the height of the liquid 12 in the tank 13 determines the position of the movable taps 15, 16 on the corresponding resistance potentiometers 17, 18, which correspond respectively to the "feet" and "inches" potentiometers so as to effect the transfer of correspondingly different voltages to the "foot" meter 10 and "inch" meter 11 in a manner described in detail hereinafter. In general, such variable voltages determined by the positions of taps 15, 16 are delivered to the corresponding potentiometer 17, 18 from a rectified voltage regulated source. The position of the taps 15, 16 may be varied in accordance with the height of the liquid 12 in the tank 13 by many different expedients, and the one illustrated diagrammatically in Figure 1 and described herein is representative of all the means which may be thus employed.

In Figure 1 the "feet" potentiometer 17 may be of the type in which the tap 15 may be rotated continuously ten turns to contact different portions of a helically wound resistance. Such potentiometers are commercially available and may be of the type manufactured by the Helipot Company of South Pasadena, California. The "inches" potentiometer 18 may be of the continuous type in which the arm 16 may be rotated continuously to contact portions of a circular resistance strip of substantially 360 degrees. These rotary elements of the potentiometers 17, 18 for moving the taps 15, 16 may be coupled to a corresponding output shaft of the gear box 22, the input shaft 22A of which is geared to the flexible perforated tape 22B through the sprocket wheel 22C mounted on shaft 22A. The gearing arrangement shown in Figure 1 is such that a difference in height of 12 inches in the liquid 12 corresponds to a complete rotation of the shaft coupled to the tap 16 of the "inches" potentiometer 18; while simultaneously a movement of the tap 15 from one outside terminal of the resistance 17 to the other outside terminal of the resistance 17 corresponds to a difference in height of the liquid 12 of approximately 50 feet to correspond with the maximum reading on the foot meter 10.

Figure 1 is described specifically in relationship to the potentiometer 17, 18, but it is apparent, from the teachings and description herein, that an identical remote transmitter unit, such as the transmitter unit comprising the potentiometer 17A, 18A, may be used additionally, and such additional remote transmitter units are exemplified by the remote transmitter unit having the general reference numeral 28, the component parts of which are numbered identical to the first described remote transmitter unit with the letter "A" appended to such reference numerals.

The junction point of the resistances 17, 18 is grounded, while the other outside terminals of the resistances 17, 18 are interconnected and connected to the high voltage lead 27 of approximately 70 volts potential. The variable tap 15 of resistance 17 is connected to one of the normally open contacts of switch 29; while the tap 16 is connected to one of the normally open contacts of switch 30, the other contacts of switches 29 and 30 being connected respectively to one terminal of the "foot" meter 10 and the "inch" meter 11. The other terminals of such meters 10, 11 are returned to ground respectively through, on the one hand, the serially connected resistances 31, 32, and on the other hand, the resistance 33, to thereby produce current flow through the meters 10, 11 when the push button type of switches 29, 30 are operated to closed position. The movable elements of such switches 29, 30 are ganged for movement in unison, as indicated by the dotted line 34. Such current flow results from the difference in potential existing between the grounded junction point of resistances 17, 18 and the high voltage on lead 27. The manner in which such voltage on lead 27 is obtained is described immediately below.

Voltage regulator 26

The voltage on lead 27 is a direct current or continuous voltage which is produced by rectifying an alternating current voltage impressed on the input primary winding of transformer 35. The alternating current voltage on the secondary winding 35A of transformer 35 is rectified by the rectifier 36 and the resulting continuous voltage is regulated by the rectifier 26. The voltage regulator 26 is of the conventional full wave type with the high potential continuous voltage lead 38 thereof connected to the lead 27 through the serially connected discharge device 39, the resistance of which is automatically varied in conventional manner to produce a substantially constant voltage on lead 27 regardless of the presence of wide voltage variations in the alternating current source feeding the transformer 35. The manner in which such discharge device 39 is controlled is in accordance with conventional practice, and, in general, an associated electron discharge device 40 is connected to vary the potential of the main control electrode of device 39 to effect changes in the plate-cathode resistance of device 39 in accordance with potential variations at the ungrounded terminal of resistance 41. Such ungrounded terminal of resistance 41 is connected to the lead 27 through the voltage regulator tube 42. As the voltage of lead 27 tends to vary, the potential of the main control electrode of device 40 correspondingly varies to effect changes in the current flow through resistance 44, which is connected between the anode of device 40 and the cathode of device 39, to, in turn, produce changes in potential of the main control electrode of device 39, which is connected to the anode of device 40 through the resistance 46.

In operation of the regulator, assuming that the voltage on lead 27 tends to increase, the potential on the main control grid of device 40 increases to thereby cause a higher current to flow through resistance 44 and device 40. Such increased current flow through resistance 44 causes the main control grid of device 39 to become more negative so as to effectively increase the plate-cathode resistance of device 39, to thereby lower the potential on lead 27. Thus, any tendency for the potential of lead 27 to increase is counteracted by a change in the plate-cathode resistance of device 39. Similarly, it will be readily apparent, that any tendency for the voltage on lead 27 to decrease will result in a decreased plate-cathode resistance of device 39 whereby the potential of lead 27 is increased.

In accordance with one of the features of the present invention, the current capacity and regulation of the voltage regulator 26, described hereinafter, is increased and improved by connecting opposite terminals of the filament of an incandescent lamp 48 respectively to the cathode and anode of device 39. While the tube 39 conducts approximately 30 to 40 milliamperes between its anode and cathode, the lamp 48 may conduct in the order of 80 mils. The tube 39 may be of the RCA type 6Y6G, and the lamp 48 may be a standard 15 watt 230 volt type. The operation of the lamp 48 depends on resistance variations of the incandescent filament, i. e., the greater the voltage difference across the terminals of lamp 48 and correspondingly the anode and cathode of device 39, the greater is the resistance of the filament of lamp 48. For example, the potential of the cathode of device 39 may be of the order of 70 volts and the potential of the anode of device 39 may be in the order of 230 volts, with the result that there is approximately a 130 volt drop across the lamp 48, which, as mentioned previously, is of the 230 volt commercial type. In operation of the regulator 26 with the lamp 48 connected as shown in Figure 1, as the plate-cathode resistance of device 39 increases, the potential drop across device 39 likewise increases, and likewise the resistance of device 48 increases, so that, in order that the intended purpose may be accomplished, the change in plate-cathode resistance of device 39 is smaller than would otherwise be the case if the resistance of the lamp 48 remained constant. Similarly, when the potential on lead 27 tends to decrease, the plate-cathode resistance of device 39 decreases, as explained hereinabove, and the resistance of lamp 48 likewise decreases, so that the change in plate-cathode resistance of device 39 need not be as great as otherwise would be the case if the lamp 48 did not change its resistance.

Automatic switching feature for obtaining readings on scale 10A or 10B

In accordance with another feature of the present invention, the "foot" meter 10, (Figures 1 and 2) having the two coaxial dial scales 10A, 10B, is automatically switched, by means described presently, to produce the proper indications on the different coaxial scale portions when a predetermined voltage exists at its terminal 105. This automatic switching is effected by the gaseous type of discharge device or thyratron 59, whose main control electrode 51 is connected through resistance 52 to such terminal 105 of the meter 10.

As shown in Figure 1, the meter 10 is connected for readings on the "Low" scale 10A, it being noted that the scales 10A and 10B may be calibrated directly in terms of feet, although essentially the meter 10 is a current measuring device. When the current through meter 10 is zero, the reading observable on scale 10A is "zero feet," and this condition exists when the movable tap 15 on the "foot" potentiometer 17 is advanced to its furthermost right position in Figure 1, i. e., grounded.

As such arm 15 is moved to the left in Figure 1 from its grounded position, the current through the meter 10 increases (it being assumed that the switches 29, 30 are closed) until substantially a full scale reading may be obtained from the dial scale portion 10A, in which latter case the movable arm 15 is substantially at a mid-position point, but not quite at a mid-position point, on the potentiometer 17. In other words, when such arm 15 is substantially at the mid-point of resistance 17, full scale readings are observable on the dial scale portion 10A. Further movement of the tap 15 from such substantially mid-position point results, by the means described hereinafter, in an automatic reduction of the current flowing through meter 10 to zero, so that continued further movement of the tap 15 to the left again causes the dial pointer 10C of meter 10 to approach its full scale deflection; and, in such latter case the position of pointer 10C is measured with reference to the dial markings on the other, "High" scale portion 10B.

Such reduction of the current flow through meter 10 to zero, as the tap 15 is moved from the right to the left in Figure 1 through its mid-position point on resistance 17, results from the "firing" of the thyratron tube 50, the main control grid 51 of which, as described previously, is made responsive to the potential on one terminal of the meter 10. When the thyratron tube 50 is "fired," the relay winding 54, serially connected between the anode of device 50 and one of the outside terminals of the secondary winding 35A, is energized to actuate the associated relay switch arms or contacts 54A, 54B. The magnetic and mechanical relationship between the relay winding 54 and its associated switches 54A, 54B is represented by the dotted lines 91, 92. It is noted that the secondary transformer winding 35A has its center tap grounded. It is noted also that the switch arms 54A, 54B each comprise a portion of a single pole double throw switch, and these switch elements 54A, 54B are shown in Figure 1, in the positions they assume when substantially no current flows through the relay winding 54. In the positions thus shown in Figure 1, the movable relay contact 54A serves merely to connect the ungrounded terminal of the secondary winding 35B to the ungrounded terminal of the green indicating lamp 65, to thereby inform an observer that readings under this condition should be made with reference to the dial scale portion 10A. In the other position of switch contact 54A, corresponding to an energized condition of relay winding 54, the red lamp 66 is energized to thereby indicate to an observer that readings on the "foot" meter 10 should be taken with reference to the dial scale portion 10B.

Also, when the relay winding 54 is deenergized, as is the case shown in Figure 1, the switch contact 54B serves merely to ground terminal 95 of resistance 66, to thereby interconnect such resistance 66 in shunt with the resistance 32, as is perhaps more clearly indicated in Figure 3.

However, when the relay winding 54 is energized, terminal 95 of resistance 66 is connected through switch contact 54B to lead 27, as shown in Figure 3, to thereby place the meter 10 in the "galvanometer" arm of a simple balanced Wheatstone bridge, it being noted that the magnitude of resistance 32 is equal to the magnitude of the resistance 66 and furthermore, at this stage, and under these conditions, when meter switching automatically occurs, the movable tap 15 is substantially at its mid-position point on the resistance 17. Thus, the Wheatstone bridge thus produced and shown in Figure 4, is balanced and no current flows through the meter 10; this condition corresponds to a reading of 25 feet on the meter scale portion 10B.

*Means for minimizing "overlap" in dial scales 10A and 10B*

It is noted that there is an overlap of about two feet (27 minus 25) in the readings on the scale portions 10A, 10B. This difference or overlap of two feet would necessarily have to be greater if the resistance 70 were not switched in the manner indicated in Figures 1, 3 and 4. The resistance 70, as explained in greater detail hereinafter, performs an important function for achieving some of the new results obtained by the use of this apparatus.

In appreciating the importance of resistance 70 it is noted that the anode of the thyratron 50 has its anode fed with alternating current voltage and that, as well known, a certain voltage differential must exist between the main control electrode 51 and the cathode of device 50 to initiate its "firing," and to interrupt its "firing"; thus, device 50 may be "fired" when a voltage differential of one volt exists between the control grid 51 and the associated cathode, and the minimum voltage differential required to allow the tube to cease "firing" may be in the order of one and one-quarter volts. It is this voltage differential between the control grid and the cathode, which effects the changeover from reading on one scale portion 10A to the other scale portion 10B, and vice versa. It is desirable, in order to minimize overlap in the scale portions 10A, 10B, that the tube 50 be "fired," or its "firing" be interrupted, as the case may be, with the movable tap 15 at substantially the same position, regardless of the direction of approach of such tap to its physical mid-position. In other words, the position the tap 15 assumes for "firing" the tube 50 should correspond to the position the tap 15 assumes when it is moved in a direction to cause the tube 50 to cease "firing." It is for this purpose of assuring better coincidence of these positions of tap 15 on resistance that the resistance 17 is connected as shown in the drawings.

In appreciating the importance and function of resistance 70 it is noted further that in the "Low" position, shown in Figure 3, because of the current flow from lead 27 and through the upper portion of resistance 17, and through the meter circuit, the potential of the tap 15, with respect to ground, when it is in its physical mid-position on resistance 17, is necessarily somewhat less than 35 volts (one-half of 70 volts), and may be in the order of 33 volts. This difference in voltage of two volts (35 minus 33) is due to the flow of meter current through the upper portion of resistance 17. Thus, while the electrical center of the resistance 17 corresponds to 35 volts (one half of 70) and the potential of a point on such resistance midway between its ends, i. e. at the physical center, is 33 volts, there is no coincidence of the electrical and physical centers of resistance 17, under these circumstances.

Comparing Figure 4 with Figure 3, when the tap 15 is at its mid-position on resistance 17, the potential of tap 15 is 35 volts, i. e., the electrical and physical centers of the resistance 17 correspond and are coincident. However, in the "Low" positions shown in Figure 3, as demonstrated above, the electrical and physical centers of the resistance 17 are not coincident. Since the tap 15 is connected to the control electrode 51 of the thyratron tube 50, its "firing" voltage and sustaining voltage is thus not at all times correctly related to the physical center of the resistance 17. In order to obtain better coincidence between the electrical and physical centers of resistance 17, the resistance 70 normally connected in parallel with the cathode resistance 84, in the "Low" position in Figure 3, has its grounded terminal transferred to lead 27 in the "High" position shown in Figure 4, to thereby elevate the potential of the cathode of device 50. In other words, from a study of Figures 3 and 4, it is observed that the resistance 70 serves to raise the potential of the cathode 2 volts, in Figure 4, to maintain the overall potential difference between the grid 51 and the cathode of device 50 at the same potential difference as in Figure 3.

Stated in further words, Figures 3 and 4 both show the tap 15 at the physical center of the resistance 17. But, in Figure 3, the resulting potential of the grid 51 is 33 volts, and the resulting potential of grid 51 in Figure 4 (in the absence of resistance 70) is 35 volts, a difference of 2 volts. A compensation is made for this two volt difference by the resistance 70 in Figure 4, which, because of its connection to lead 27, causes the cathode of device 50 to be increased 2 volts, it being noted that the serially connected resistances 70 and 84, in such case, are in a voltage dividing circuit, with the potential at their junction point, i. e. the cathode of device 50, determined by the relative magnitudes of resistances 70 and 84.

*Means for rendering firing of tube 50 substantially independent of supply voltage variations*

Another feature of the present invention resides in the circuitry for rendering the operation, i. e., the "firing" of the tube 50 substantially independent of the changes in its cathode potential resulting in, for example, change in the alternating current voltage delivered to the heater 78 of device 50 from the secondary winding 35B. To appreciate this feature, is is noted that the potential transferred from the terminal 105 of meter 10 to the grid 51 of device 50 through lead 79 is regulated, and, therefore, the potential of lead 79 is substantially independent of the voltage variations in the alternating current source supplying the transformer 35 with energy.

It is noted further that the cathode of device 50 is connected to the high voltage lead 27 through resistance 80, to thereby supply the cathode with a regulated potential substantially constant in magnitude; however, the same cathode is connected through resistance 81, for an important purpose, to a voltage point in the power supply which is unregulated, i. e., a point which may vary in potential in accordance with the potential variations of the voltage applied to transformer 35 and to the heater 78. The cathode of device 50 is also connected to the ungrounded terminal of resistance 84. Further, it is noted that the main control electrode 51 is connected to ground through the serially connected resistance 85 and variable resistance 86. The resistances 85 and 86 are thus in a voltage dividing circuit with the resistance 52, so that adjustment of variable resistance 86 results in a variation of voltage of the control electrode 51.

The operation of the device 50 is compensated by the resistance 81 so that the tube 50 may "fire" when the lead 79 acquires a definite predetermined potential regardless of the alternating current line voltage applied to transformer 35 and to the cathode heater 78 of device 50 through the secondary winding 35B.

To appreciate the importance of resistance 81, it is observed that when the alternating current voltage across winding 35B increases, then the cathode of the thyratron tube 50 becomes hotter to emit more electrons, to in turn cause the potential of the grid 51 to increase because of grid current rectification. Thus, even though the potential of lead 79 may be constant, the potential of the grid 51, isolated from lead 79 through resistance 52, increases with respect to its cathode, but, simultaneously the unregulated voltage on lead 38, which varies in accordance with the alternating current line voltage, increases to produce an increased current flow through resistance 81 and 84 to elevate the potential of the cathode of device 50, to thereby tend to render the potential difference between the control grid and the cathode substantially constant regardless of the variations in value of line voltage.

Summarizing, the operation of the liquid level indicating instrument is as follows. When and as the liquid 12 in tank 13 rises, the movable tap 15 is first effective to produce indications on the dial scale portion 10A and then subsequently on the dial scale portion 10B. As shown in Figure 1, the tap 15 is in position for readings on scale 10A. As the liquid 12 rises the tap 15 is moved to the left a sufficient amount in Figure 1, whereupon the lead 79 (with the push button switch 29, 30 closed) acquires a sufficiently large potential to cause the thyraton tube 50 to fire. Firing of the thyratron tube 50 results in energization of the relay winding 54 and actuation of the associated switches 54A, 54B. Such actuation of switches 54A, 54B results in conversion of the circuit shown in Figure 3 to the circuit shown in Figure 4, it being noted that in Figure 4 the "foot" meter 10 is placed in the "galvanometer arm" of the Wheatstone bridge in a condition wherein substantially no current flows therethrough; and, the instrument 10 is then in condition for reading liquid levels on the scale 10B. The voltage transferred from potentiometer 17 to the lead 79 is a voltage regulated by the voltage regulator 20, the operation of which is described in detail hereinabove. Further, to prevent voltage variations in the alternating current supply source from detrimentally affecting the operating characteristics of the thyratron tube 50, the cathode of device 50 is connected through resistance 81 to lead 38, an unregulated voltage source, to achieve the desirable results described in detail hereinabove.

While the particular embodiments of the present invention have been shown and described, it will be obvious to those skilled in the art that changes and modifications may be made without departing from this invention in its broader aspects and, therefore, the aim in the appended claims is to cover all such changes and modificationsa as fall within the true spirit and scope of this invention.

I claim:

1. In indicating apparatus of the character described, wherein a current sensitive meter having different scale portions for cooperation with a single pointer is used, and wherein such scale portions are substantially continuations one of the other, a regulated voltage source delivering current to a resistance network, said resistance network including a potentiometer resistance having a variable tap thereon, said tap being connected to said meter to produce current flow therethrough, the mid-position of said tap on said resistance corresponding substantially to full scale reading on one of said scale portions and also zero reading on the succeeding scale portion, voltage sensitive means responsive to movement of said tap and functioning to automatically transfer scale readings from one scale portion to the other scale portion when said tap is substantially at the mid-point on its potentiometer resistance, and means arranged to automatically change the sensitivity of said voltage sensitive means when readings are being produced on one scale portion to compensate for the flow of current through said potentiometer resistance to thereby minimize the overlap of scale divisions on the two scale portions.

2. In an indicating system of the character described wherein a current sensitive meter having two continuous scale portions is arranged for cooperation with a single cooperating dial pointer to allow the use of large faced instruments observable at relatively long distances, said meter having a first scale portion and a second scale portion each with overlapping scale divisions, both of said scale portions having indicia thereon at their respective lower scale reading ends corresponding to zero current flow through said meter, a source of voltage, a resistance network connected to said source and including a potentiometer resistance with a tap thereon movable in accordance with the condition being measured, said tap, being connected to said meter for current flow therethrough and in its substantially mid-position on said potentiometer resistance, corresponding, on the one hand, to full scale reading on said first scale portion, and to zero current reading on the second scale portion, voltage sensitive means responsive to movement of said tap and automatically operative when said tap is substantially in its mid-position on its potentiometer resistance to decrease the current flow through said meter to effect changes in readings from said first scale portion to said second scale portion, and means arranged to automatically change the sensitivity of said voltage sensitive means when readings are being produced on one scale portion to minimize the overlap in scale divisions on the two scale portions necessitated by current flow through said potentiometer resistance.

3. In an indicating system of the character described, wherein a current sensitive meter having two continuous scale portions is arranged for cooperation with a single cooperating dial pointer to allow the use of large faced instruments observable at relatively long distances, said scale having a first scale portion and a second scale portion each with overlapping scale divisions, both of said scale portions having indicia thereon at their respective lower scale reading ends corresponding to zero current flow through said meter, a source of voltage, a resistance network connected to said source and including a potentiometer resistance with a tap thereon movable in accordance with the condition being measured, said tap, in its substantially mid-position on said potentiometer resistance, corresponding, on the one hand, to full scale reading on said first scale portion, and to zero current reading on the second scale portion, said meter being connected to said potentiometer resistance to produce a current flow therethrough from said voltage source, a Wheatstone bridge having as two arms thereof different portions of said potentiometer resistance, voltage sensitive means responsive to the voltage of said tap and operative when said tap reaches substantially its mid-position on said potentiometer to connect said meter in the "galvanometer" arm of a said Wheatstone bridge wherein the current flow through said meter is reduced thereby substantially to zero corresponding to the lowest scale reading on said second scale portion, and means operative upon operation of said voltage sensitive means to automatically change the sensitivity of said voltage sensitive means when readings are being produced on one scale portion to minimize the overlap in scale divisions on the two scale portions necessitated by current flow through said potentiometer resistance.

4. In an indicating system of the character described, a source of voltage, a resistance network including a potentiometer resistance connected to said source, said potentiometer resistance having a tap thereon movable in accordance with the condition being measured, a current sensitive meter having two continuous scale portions arranged for cooperation with a single cooperating dial pointer to allow the use of large faced instruments observable at relatively long distances, said meter having a first scale portion and a second scale portion each with overlapping scale divisions, both of said scale portions having indicia thereon at their respective lower scale reading ends corresponding to zero current flow through said meter, said meter being connected to said tap to produce a current flow from said source through said potentiometer resistance and through said meter when readings are being indicated on said first scale portion, a Wheatstone bridge having as two arms thereof different portions of said potentiometer resistance, and means operative when said tap assumes a predetermined potential corresponding substantially to the position of the tap in its mid-position on its potentiometer resistance, for connecting said meter in the "galvanometer" arm of said Wheatstone bridge.

5. The invention defined in the next preceding claim characterized by the fact that the last mentioned means incorporates a voltage responsive electron discharge device connected to said tap and to said source to alter the relative potential of the control grid of said device with respect to its cathode, in accordance with the potential of said tap.

6. In an indicating system of the character described, an unregulated voltage source subject to fluctuations, a voltage regulator connected to said source to supply a regulated voltage, a resistance network including a potentiometer resistance with a movable tap thereon connected to said voltage regulator, said tap being movable in accordance with the condition being measured, a current sensitive meter having two continuous scale portions arranged for cooperation with a single cooperating dial pointer to allow the use of large faced instruments observable at relatively long distances, said meter having a first scale portion and a second scale portion each with overlapping scale divisions, said meter being connected to said tap and to said regulator to draw current through said potentiometer resistance, a Wheatstone bridge having as two arms thereof different portions of said potentiometer resistance, means including a thyratron tube arranged to connect said meter in the "galvanometer" arm of said Wheatstone bridge in response to the potential on said tap, and the voltage differential between the control grid and the cathode of said thyratron tube being responsive both to regulated voltages and unregulated voltages to render operation of said thyratron tube substantially independent of the magnitude of the unregulated voltage source which is connected to supply heating current to the cathode.

PIERCE E. REEVES.

REFERENCES CITED

The following references are of record in the file of this patent:

UNITED STATES PATENTS

| Number | Name | Date |
|---|---|---|
| 2,120,884 | Brown | June 14, 1938 |
| 2,206,123 | Rinia | July 2, 1940 |
| 2,405,689 | De Giers | Aug. 13, 1946 |
| 2,441,348 | Ducruet | May 11, 1948 |
| 2,443,122 | Smith | June 8, 1948 |
| 2,443,623 | Koenig | June 22, 1948 |
| 2,448,783 | De Giers | Sept. 7, 1948 |

FOREIGN PATENTS

| Number | Country | Date |
|---|---|---|
| 102,104 | Great Britain | Nov. 16, 1916 |